(12) United States Patent
Kita et al.

(10) Patent No.: US 7,800,010 B2
(45) Date of Patent: Sep. 21, 2010

(54) WIRE-CUT ELECTRIC DISCHARGE MACHINE HAVING WIRE TENSION CONTROL FUNCTION

(75) Inventors: Yuki Kita, Yamanashi (JP); Hiroyuki Abe, Yamanashi (JP); Yoshinori Makino, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 377 days.

(21) Appl. No.: 12/029,105

(22) Filed: Feb. 11, 2008

(65) Prior Publication Data
US 2008/0217300 A1 Sep. 11, 2008

(30) Foreign Application Priority Data
Mar. 8, 2007 (JP) .............................. 2007-058234

(51) Int. Cl.
B23H 7/10 (2006.01)
(52) U.S. Cl. .................................. 219/69.12
(58) Field of Classification Search .............. 219/69.12; 242/563; 700/162
See application file for complete search history.

(56) References Cited
U.S. PATENT DOCUMENTS
5,216,217 A * 6/1993 Morishita et al. ........ 219/69.12
2007/0140947 A1 6/2007 Schneider et al.
2008/0233041 A1 9/2008 Jang et al.

FOREIGN PATENT DOCUMENTS
| JP | 6-40711 A | 2/1994 |
| JP | 6-80391 B | 10/1994 |
| JP | 6-287010 A | 10/1994 |
| JP | 7-68421 A * | 3/1995 |
| JP | 07-328849 A | 12/1995 |
| JP | 2001-328029 A | 11/2001 |
| JP | 2007-145674 A | 6/2007 |
| JP | 2007-516923 A | 6/2007 |

(Continued)

OTHER PUBLICATIONS

Machine translation of Japan Patent document No. 7-68,421, Apr. 2010.*

(Continued)

*Primary Examiner*—Geoffrey S Evans
(74) *Attorney, Agent, or Firm*—Lowe Hauptman Ham & Berner LLP (57) ABSTRACT

When a wire electrode is arranged along a traveling path by manual operation, a motor M1 for feeding the wire electrode to a workpiece is driven in response to a predetermined torque command from a control section with a switch SW1 on a side a. The wire electrode is connected, and a motor M2 for delivering the electrode from the wire is driven at a predetermined speed, whereby the electrode is run. Then, the switch SW1 is shifted to a side b and a switch SW2 to the side a, and the motor M1 is subjected to torque control such that a tension on the wire electrode detected by a tension detector is equal to a command tension. When a variation of the tension on the wire electrode is converged, the switches SW1 and SW2 are shifted to the side b, speed control of the motor M1 is performed so that detected tension is equal to the command tension, and electric discharge machining is started.

5 Claims, 5 Drawing Sheets

FOREIGN PATENT DOCUMENTS

| | | |
|---|---|---|
| JP | 2008-44840 A | 2/2008 |
| JP | 2008-273807 A | 11/2008 |
| JP | 2008-280195 A | 11/2008 |

OTHER PUBLICATIONS

Machine translation of Japan Patent document No. 7-328,849, Apr. 2010.*

GCMEA (Global Congress on Microwave Energy Applications) Aug. 2008 MAJIC 1st Proceedings, "The New Flame for Humanity".

Junfeng Geng et al., "Direct conversion of nickel stearate into carbon nanotubes or pure-phase metallic Ni nanoparticles encapsulated in polyhedral graphite cages," J. Matter Chem., Jan. 2005, 15, pp. 844-849.

Jin-Huan Huang et al., "Selective growth of carbon nanotubes on nickel oxide templates created by atomic force microscope nano-oxidation," Diamond & Related Materials, 14, Feb. 2005, pp. 744-748.

Chia-Chih Chuang et al., "The role of Ti interlayer in carbon nanotube growth," Surface & Coatings Technology, 202, Jan. 2008, pp. 2121-2125.

* cited by examiner

WIRE-CUT ELECTRIC DISCHARGE MACHINE HAVING WIRE TENSION CONTROL FUNCTION

RELATED APPLICATIONS

The present application is based on, and claims priority from, Japanese Application Number 2007-058234, filed Mar. 8, 2007, the disclosure of which is hereby incorporated by reference herein in its entirety.

BACKGROUND OF THE INVENTION

1. Field of the Invention

The present invention relates to a wire-cut electric discharge machine having a wire tension control function.

2. Description of the Related Art

In a wire-cut electric discharge machine, a tension is applied to a wire electrode as the electrode is run, a voltage is applied between a workpiece to be machined and the electrode to cause electric discharge, and the workpiece is machined by the electric discharge. In order to apply the tension to the wire electrode, a take-up roller is driven by a motor to take up the electrode at a fixed speed. Further, the tension is applied to the electrode by using a brake roller that is provided with resistance applying means, such as a powder brake, for controlling torque.

In a known wire electrode tension control, a first motor for feeding a wire electrode to a workpiece and a second motor for delivering the wire electrode from the workpiece are located on the wire feed side and takeout side, respectively, of the workpiece. In this tension control, the tension on the wire electrode is detected by means of a tension detector, and the speed of the motor is controlled so that the difference between the detected tension and a preset tension is zero (see Japanese Patent Application Laid-Open No. 7-328849).

In another known wire electrode tension control, capstans that run a wire electrode held by pinch rollers are disposed individually on the upstream side and downstream side with respect to the feed of the electrode to a workpiece, and a tension on the wire electrode is controlled in a manner such that the upstream capstan is rotated at a fixed speed and the downstream capstan is given a fixed torque that acts in the same direction as the direction of the rotation. In still another known wire electrode tension control, a tension on a wire electrode is controlled in a manner such that the rotational speed of a downstream capstan is fixed and an upstream capstan is given a fixed torque that acts reversely to the rotating direction. In a further known wire electrode tension control, a tension is applied to a wire electrode in a manner such that the travel of the electrode is braked by making the peripheral speed of an upstream capstan lower than that of a downstream capstan (see Japanese Patent Application Laid-Open No. 2001-328029).

In wire-cut electric discharge machining, a wire electrode delivered from a wire bobbin is arranged along a traveling path, including guide rollers, a feed roller, a machining start hole or groove in a workpiece, delivery rollers, etc. This arrangement of the wire electrode along the traveling path is called wire connection. The electric discharge machining is performed with the feed roller and the delivery rollers driven to run the wire electrode as a voltage is applied between the electrode and the workpiece.

When the travel of the wire electrode is started in order to connect the electrode, thereby starting the electric discharge machining, the guide rollers and the like are stationary. At the start of travel of the wire electrode, the static friction force and inertial force of the guide rollers act as a tension on the electrode, and this tension is unstable. In many cases, therefore, the control is so unstable that the wire electrode inevitably breaks despite the application of the prior art techniques in which the tension control is performed based on speed control of the motor that drives the travel of the electrode.

The wire electrode sometimes must be manually delivered when the wire bobbin is to be replaced with a new one or if the electrode is broken during machining. Conventionally, in manually delivering the wire electrode to be connected, a feed motor that feeds the electrode toward the workpiece is never driven, and its speed control is disabled. In order to reduce costs and simplify the structure, moreover, a speed reduction mechanism is generally used for the motor that drives the travel of the wire electrode. Thus, if the wire electrode is to be manually taken out with the motor drive stopped, the operation entails use of an additional force FR (=force (F) for no-load slip torque of motor×deceleration ratio (R)). Thus, the manual delivery requires a considerable force.

In general, on the other hand, the diameter of a wire electrode ranges from 0.02 mm to 0.4 mm. If the diameter is not larger than 0.15 mm, the wire electrode may possibly be broken by an excessive tension when it is manually delivered.

SUMMARY OF THE INVENTION

Accordingly, the object of the present invention is to prevent breakage of a wire electrode in a pre-machining operation prior to electric discharge machining.

According to a first aspect of the present invention, a wire-cut electric discharge machine having a wire tension control function comprises a first motor for feeding a wire electrode to a workpiece to be machined, a second motor for delivering the wire electrode from the workpiece, tension detecting means which is located between the workpiece and the first motor and detects a tension on the wire electrode, speed detecting means for detecting respective rotational speeds of the first and second motors, first control means for controlling the rotational speed of the first motor to be equal to a preset rotational speed, second control means for controlling a rotational torque of the second motor so that the tension on the wire electrode detected by the tension detecting means is at a preset value, third control means for controlling the rotational speed of the second motor so that the tension on the wire electrode detected by the tension detecting means is at a preset value, and switching control means which causes the first control means to drivingly control the first motor, causes the second control means to perform torque control for the second motor, thereby running the wire electrode, and switches the second control means over to the third control means to perform speed control for the second motor when machining is started. With this arrangement, breakage of the wire electrode is prevented by reducing an excessive load that acts on the electrode at the start of its travel.

The switching control means may start the machining and switch the second control means over to the third control means after the passage of a preset time since the start of travel of the wire electrode.

The switching control means may start the machining and switch the second control means over to the third control means after the tension on the wire electrode detected by the tension detecting means is kept within a predetermined range for a preset time or longer after the wire electrode is run.

The wire-cut electric discharge machine may further comprise drive control means for driving the first motor with a preset torque.

According to a second aspect of the present invention, a wire-cut electric discharge machine having a wire tension control function comprises a first motor for feeding a wire electrode to a workpiece to be machined, a second motor for delivering the wire electrode from the workpiece, tension detecting means which is located between the workpiece and the first motor and detects a tension on the wire electrode, speed detecting means for detecting respective rotational speeds of the first and second motors, first control means for controlling the rotational speed of the second motor to be equal to a preset rotational speed, second control means for controlling a rotational torque of the first motor so that the tension on the wire electrode detected by the tension detecting means is at a preset value, third control means for controlling the rotational speed of the first motor so that the tension on the wire electrode detected by the tension detecting means is at a preset value, and switching control means which causes the first control means to drivingly control the second motor, causes the second control means to perform torque control for the first motor, thereby running the wire electrode, and switches the second control means over to the third control means to perform speed control for the first motor when machining is started. With this arrangement, breakage of the wire electrode is prevented by reducing an excessive load that acts on the electrode at the start of its travel.

The switching control means may start the machining and switch the second control means over to the third control means after the passage of a preset time since the start of travel of the wire electrode.

The switching control means may start the machining and switch the second control means over to the third control means after the tension on the wire electrode detected by the tension detecting means is kept within a predetermined range for a preset time or longer after the wire electrode is run.

The wire-cut electric discharge machine may further comprise drive control means for driving the first motor with a preset torque.

The wire-cut electric discharge machine having a invention constructed in this manner can prevent an excessive tension from acting on the wire electrode at the start of its travel, thereby preventing breakage of the electrode. In manually delivering the wire electrode, an operator can easily arrange and connect the electrode without being subjected to a heavy load and failing to prevent breakage of the electrode.

BRIEF DESCRIPTION OF THE DRAWINGS

The above and other objects and features of the present invention will be apparent from the ensuing description of embodiments with reference to the accompanying drawings, in which.

DETAILED DESCRIPTION OF THE PREFERRED EMBODIMENTS

Figure 1:
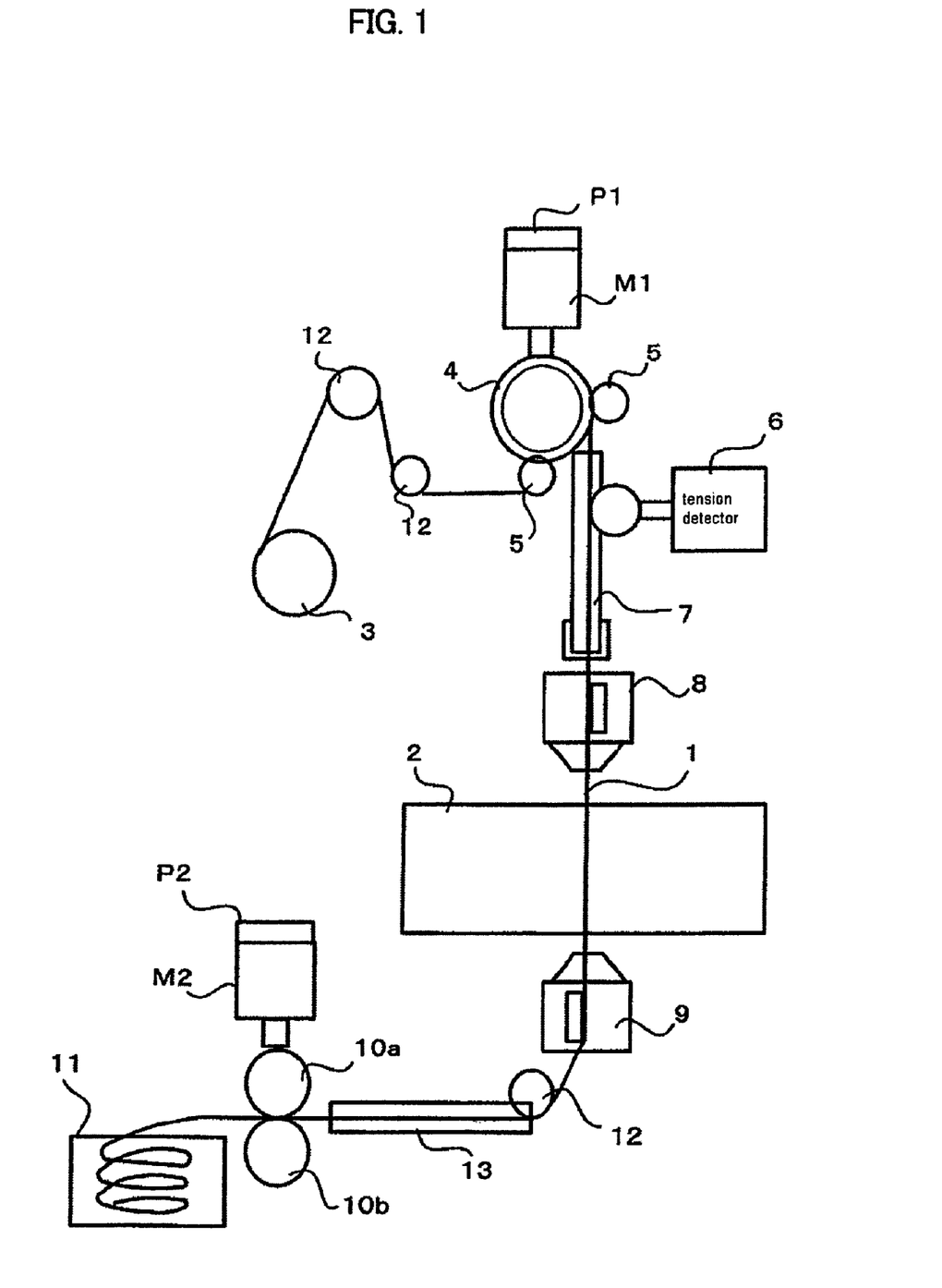
FIG. 1 is a diagram illustrating principal parts of a wire-cut electric discharge machine according one embodiment of the present invention.

FIG. 1 is a diagram illustrating principal parts of a wire-cut electric discharge machine according to one embodiment of the present invention, and mainly shows a traveling path for a wire electrode 1.

The wire electrode 1 is taken out of a wire bobbin 3, and guided by guide rollers 12, fed to a feed roller 4 that drives the wire electrode to travel, and held between the feed roller 4 and pinch rollers 5. Then, the electrode 1 passes through an automatic wire connector 7, an upper wire guide 8, and a workpiece 2 to be machined (or through a machining start hole in the workpiece 2 in starting virgin electric discharge machining). Thereafter, the wire electrode 1 is guided by a lower wire guide 9 and a guide roller 12, and passes through a guide tube 13, held between a pair of delivery rollers 10a and 10b, and is recovered into a scrap wire recovery box 11. The wire electrode 1 is disposed and connected along the traveling path to undergo these processes.

The feed roller 4 that feeds the wire electrode 1 toward the workpiece 2 is driven by a first motor (feed motor M1). The delivery rollers 10a and 10b are driven by a second motor (delivery motor M2) that takes out the electrode 1 from the workpiece 2. A tension detector 6 is disposed between the feed roller 4 and the delivery rollers 10a and 10b. The detector 6 detects a tension on the electrode 1 in a region where the electrode 1 performs electric discharge machining for the workpiece 2. In the example shown in FIG. 1, the tension detector 6 is located between the workpiece 2 and the feed roller 4. Further, speed detectors P1 and P2 for detecting the respective rotational speeds of the feed motor M1 and the delivery motor M2 are attached to the motors M1 and M2, respectively.

In this embodiment, a tension is applied to the wire electrode 1 in the machining region by controlling the respective speeds or torques of the feed motor M1 and the delivery motor M2. As the electric discharge machining is performed, the speed of the feed motor M1 or the delivery motor M2 is controlled so that the tension detected by the tension detector 6 is adjusted to a preset value. In this embodiment, the rotational speed of the delivery motor M2 is controlled to be fixed, while the rotational speed of the feed motor M1 is controlled so that the tension detected by the tension detector 6 equals the preset tension.

If speed control for the feed motor M1 or the delivery motor M2 is commenced when the travel of the wire electrode 1 is started to connect the electrode 1 and initiate the machining, the electrode 1 sometimes may break due to an unstable tension that is caused by the static friction force or inertial force of the pinch rollers 5 and the like. If speed control is performed from the start of the travel of the wire electrode 1 that is loose, the tension on the electrode 1 is "0" when the delivery motor M2 that takes up the electrode 1 starts to rotate, and the feed motor M1 on the braking side is not actuated. In consequence, a heavy load acts on the electrode 1 so that the electrode may break in some cases.

At the start of the travel of the wire electrode 1, according to the present embodiment, therefore, a control method that is different from a method for controlling the tension on a wire electrode 1 based on the conventional speed control during electric discharge machining is employed so that the electrode 1 can be prevented from breaking by feeding the wire electrode 1 by torque control.

It is experimentally revealed, on the other hand, that speed control is preferable to torque control for maintaining the tension on the wire electrode 1 constant in a state where the travel of the wire electrode 1 is stabilized and the tension is stabilized. According to the present embodiment, therefore, torque control is performed until the tension on the wire electrode 1 is stabilized at the initial stage of travel of the wire electrode 1. When the wire tension is stabilized, tension control based on speed control is performed to start machining.

In replacing the wire bobbin 3 with a new one or if the wire electrode 1 is broken during the machining, moreover, the wire electrode must be connected along its traveling path. In this case, the electrode 1 is manually drawn out of the wire bobbin 3 and arranged along the traveling path by an operator, and wire connection is performed by using the automatic wire connector 7. In a wire-cut electric discharge machine that is not provided with the automatic wire connector 7, the wire connection is performed by the operator's manual operation.

In this case, the operation must be manually performed before the wire connection operation by the automatic wire connector 7 is started after the wire electrode 1 is drawn out of the wire bobbin 3, held between the feed roller 4 and the pinch rollers 5, and then drawn out therefrom.

In the wire-cut electric discharge machine that is not provided with the automatic wire connector 7, moreover, the operation must be manually performed to the end of the wire connection. Conventionally, the wire electrode 1 is passed between the feed roller 4 and the pinch rollers 5 and manually drawn out therefrom with speed control of the feed motor M1 and the delivery motor M2 suspended during the wire connection operation. With this manual operation, the wire electrode 1 sometimes may be broken by an excessive tension that is attributable to the static friction force or inertial force of the guide rollers 12, feed roller 4, pinch rollers 5, etc.

In view of the above, the present invention is designed to carry out control lest an excessive tension should act on the wire electrode during wire connection operation.

Figure 2:
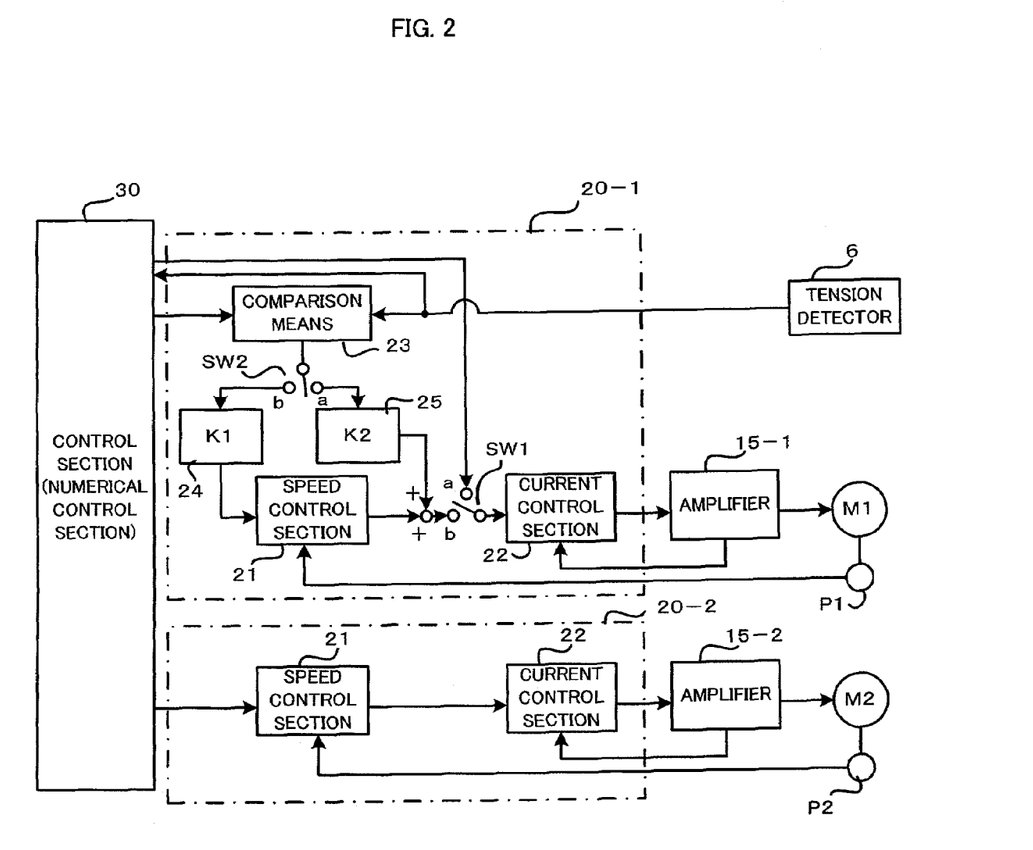
FIG. 2 is a block diagram showing principal parts of a controller for controlling the wire-cut electric discharge machine shown in FIG. 1.

FIG. 2 is a block diagram showing principal parts of a controller for controlling the wire-cut electric discharge machine shown in FIG. 1, mainly including drive control systems for the feed motor M1 and the delivery motor M2 for driving the travel of the wire electrode 1.

A numerical controller that is composed of a programmable machine controller and a processor may be used as the controller shown in FIG. 2. This controller roughly includes a control section (numerical control section) 30 for general control and motor control sections 20-1, 20-2, . . . that control individual motors.

As shown in FIG. 2, the control section 30 is connected with the motor control section 20-1 for controlling the feed motor M1 and the motor control section 20-2 for controlling the delivery motor M2. The control section 30 is further connected with X-, Y-, and Z-axis motors and U- and V-axis motors, which move the wire electrode 1 relatively to the workpiece 2. Since these motors have no direct connection with the present invention, their respective control sections are not shown in FIG. 2.

The motor control sections 20-1 and 20-2 shown in FIG. 2, like conventional ones, are each composed of a processor, a memory, etc. The block diagram of FIG. 2 shows functions that are executed by this processor. Thus, FIG. 2 is a functional block diagram. The control section 30 is also connected with a power source unit for applying a voltage between the workpiece 2 and the wire electrode 1, the automatic wire connector 7, etc. Since this arrangement has no connection with the present invention either, it is not shown in FIG. 2.

The motor control section 20-1 for the feed motor M1, like the conventional one, is provided with a speed control section 21 and a current control section 22. According to the present embodiment, moreover, the motor control section 20-1 is provided with comparison means 23, switches SW1 and SW2, and blocks 24 and 25. The comparison means 23 obtains and outputs a difference (tension deviation $\epsilon$) between a tension command from the control section 30 and a detected tension from the tension detector 6. The blocks 24 and 25 multiply the tension deviation by proportional gains K1 and K2 and output resulting products.

The switch SW1 selectively determines whether to accept a torque command from the speed control section 21 or the block 25 for the multiplication by the proportional gain K2 (switchover to a side b) or to accept a torque command from the control section 30 (switchover to a side a). The current control section 22, like a conventional one, performs current feedback control based on the torque command (current command) accepted through the switch SW1 and a current feedback value fed back from a current detector, which is attached to an amplifier 15-1 and detects a driving current, thereby obtaining a voltage command for the feed motor M1. Then, the current control section 22 outputs the obtained voltage command to the amplifier 15-1 to drive the motor M1.

The comparison means 23 obtains and outputs the difference (tension deviation $\epsilon$) between the tension command from the control section 30 and the detected tension from the tension detector 6. The switch SW2 selectively determines whether to output the tension deviation $\epsilon$ obtained by the comparison means 23 to the block 25 for the proportional gain K2 (switchover to the side a) or to the block 24 for the proportional gain K1 (switchover to the side b). The block 25 for the proportional gain K2 obtains a torque command by multiplying the tension deviation $\epsilon$ by the proportional gain K2 and outputs it to the side b of the switch SW1. The block 24 for the proportional gain K1 obtains a speed command by multiplying the tension deviation $\epsilon$ by the proportional gain K1 and outputs it to the speed control section 21.

The speed control section 21, like a conventional one, performs speed feedback control based on the input speed command and a speed feedback value detected by and fed back from the speed detector P1, which is attached to the feed motor M1, thereby obtaining a torque command (current command), and outputs the torque command to the side b of the switch SW1.

The motor control section 20-2 that controls the delivery motor M2 is composed of a speed control section 21 and a current control section 22. It performs speed feedback control based on a speed command from the control section 30 and a speed feedback value from the speed detector P2, which is attached to the delivery motor M2, thereby obtaining a torque command (current command). The current control section 22 performs current feedback control based on the obtained torque command and a current feedback value from an amplifier 15-2, thereby obtaining a voltage command for the feed motor M2. Then, the current control section 22 outputs the obtained voltage command to the amplifier 15-2 to drive the motor M2. Since the speed and current control sections 21 and 22 of the motor control section 20-2 have the same functions as their counterparts of the motor control section 20-1, the same reference numerals are used for component parts corresponding to each other.

The following is a description of the operation of the wire-cut electric discharge machine according to the present embodiment.

In replacing the wire bobbin 3 with a new one or connecting the wire electrode 1 when the electrode 1 is broken, the operator arranges the electrode 1 from the bobbin 3 to the feed roller 4 and inputs a drive command for the feed motor M1 to the controller to be ready for the arrangement of the electrode 1.

On receipt of the drive command for the feed motor M1, a processor of the control section 30 of the controller outputs a switching command for torque control for the feed motor M1 (command for switchover to the side a of the switch SW1 in FIG. 2) and a torque command (current command) of a preset value. On receipt of the switching command for torque control, the processor of the motor control section 20-1 for the feed motor M1, like a conventional one, performs current feedback control (processing of the current control section 22) based on the torque command (current command) of the commanded preset value and a current feedback value fed back from the current detector that is attached to the amplifier 15-1 and detects the driving current, thereby obtaining the voltage command for the feed motor M1. Then, the processor outputs the obtained voltage command to the amplifier 15-1 to drive the motor M1. In consequence, the feed motor M1 is driven with a commanded torque.

This operation is an operation to be performed when the wire travel is stopped. The torque commanded in this operation is previously set to a force that is a little smaller than the aforementioned "force (FR)=force (F) for no-load slip torque of motor×deceleration ratio (R)" in a direction in which the wire electrode 1 is manually drawn out (in other words, to a force small enough not to cause the wire bobbin to start unintended rotation). Thereupon, the operator can easily deliver the wire electrode 1 with a small force without breaking it. As mentioned before, the feed motor M1 can be easily driven with a predetermined torque in order to facilitate the manual delivery of the wire electrode and prevent breakage of the electrode. Therefore, a description of this operation with reference to a flowchart is omitted.

Figure 3:
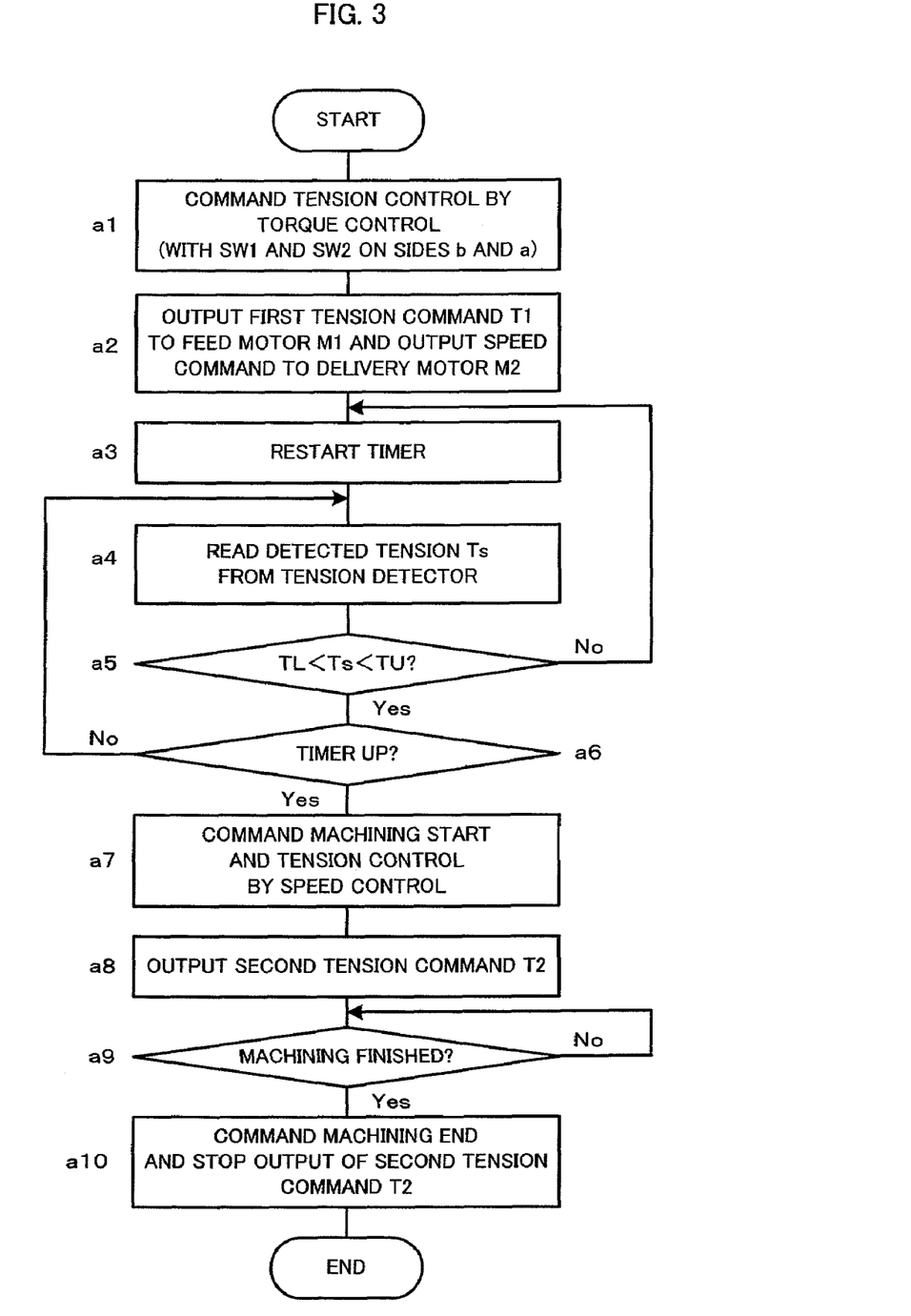
FIG. 3 is a flowchart showing an algorithm of tension control processing for a wire electrode executed by a processor of a control section of the controller shown in FIG. 2.
Figure 4:
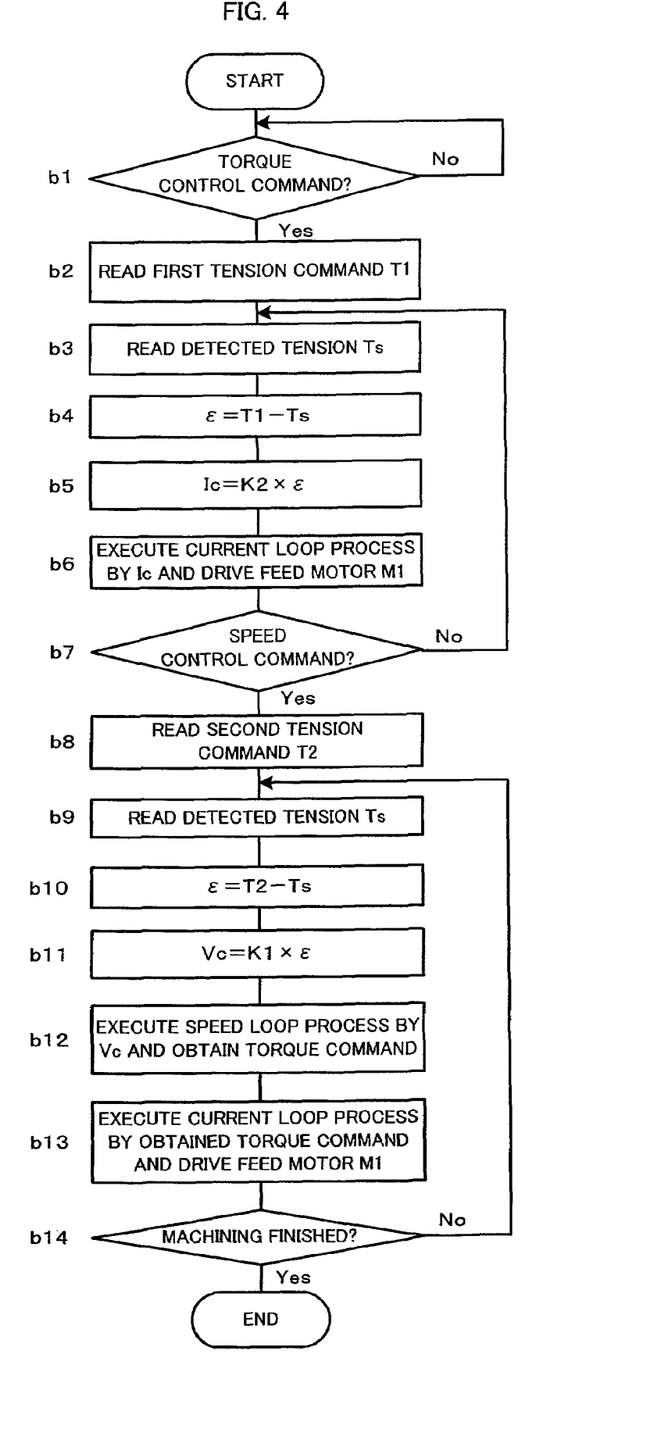
FIG. 4 is a flowchart showing an algorithm of tension control processing for the wire electrode executed by a processor of a motor control section for a feed motor shown in FIG. 2.

When a machining command is input after the connection operation for the wire electrode 1 is finished, the processor of the control section 30 starts processing shown in the flowchart of FIG. 3, while the processor of the motor control section 20-1 starts processing shown in the flowchart of FIG. 4.

FIG. 3 is a flowchart showing an algorithm of tension control processing for the wire electrode 1 that is executed by the processor of the control section 30 when the electrode 1 is run. FIG. 4 is a flowchart showing an algorithm of tension control processing for the wire electrode 1 that is executed by the processor of the motor control section 20-1 for the feed motor M1 when the electrode 1 is run.

When a machining start command is input to the controller, the processor of the control section 30 first outputs a tension control command based on torque control to the motor control section 20-1 for the feed motor M1 (Step a1). Then, a first tension command T1 is delivered to the motor control section 20-1, and a speed command corresponding to the traveling speed of the wire electrode 1 during set machining is output to the motor control section 20-2 for the delivery motor M2 (Step a2). Thereupon, the travel of the wire electrode 1 is initiated, and moreover, a timer is reset and started (Step a3).

On receipt of this speed command, on the other hand, the processor of the motor control section 20-2 for the delivery motor M2 executes the processing of the speed control section 21. Based on this speed command and the speed feedback value fed back from the speed detector P2, the processor performs speed feedback control, such as a proportional and integral processing, to obtain a torque command (current command) (processing in the speed control section 21).

Based on the obtained torque command (current command) and the current feedback value, the processor performs current feedback control (processing in the current control section 22), thereby obtaining a voltage command. Then, the processor outputs the obtained voltage command to the amplifier 15-2 to drive the motor M2.

Thereupon, the delivery motor M2 is drivingly controlled at a commanded speed to run the wire electrode 1 at a preset speed. Omitted is a flowchart for processing that is executed by the motor control section 20-2 for drivingly controlling the delivery motor M2.

When the tension control command based on torque control from the control section 30 is detected (Step b1), the motor control section 20-1 for the feed motor M1 switches the control mode to a torque control mode (or switches over the switches SW1 and SW2 shown in FIG. 2 to the sides b and a, respectively), reads the first tension command T1, and further reads an output (detected tension Ts) of the tension detector 6 (Steps b2 and b3).

Then, the tension deviation $\epsilon$ is obtained by subtracting the read detected tension Ts from the tension command T1 (Step b4), and a torque command (current command) Ic is obtained by multiplying the obtained tension deviation $\epsilon$ by the proportional gain K2 (proportional gain for tension control based on torque control) (Step b5). Current feedback control is performed based on the obtained torque command (current command) Ic, and a command voltage for the feed motor M1 is output to the amplifier 15-1 to drive the motor M1 (Step b6). In this control operation, the torque of the feed motor M1 is controlled by tension feedback control to drive the motor M1.

Then, it is determined whether or not a tension control command based on speed control is input (Step b7), the processes of Steps b3 to b7 are repeatedly executed until a tension control command is input, and the torque of the feed motor M1 is controlled so that the tension on the wire electrode 1 is adjusted to the preset value.

On the other hand, the processor of the control section 30 resets and starts the timer (Step a3), then reads the detected tension Ts output from the tension detector 6 (Step a4), and determines whether or not the read detected tension Ts is within a preset range of tension (range from TL to TU) (Step a5). If the detected tension Ts is deviated from the preset range of tension, the procedure returns to Step a3, in which the timer is reset and started. Then, the process of Step a4 and the subsequent processes are executed. If the detected tension Ts is within the preset range of tension, on the other hand, it is determined whether or not a preset time in the timer is up (Step a6).

If the preset time in the timer is not up yet, the procedure returns to Step a4, and the execution of the process of Step a4 and the subsequent processes is repeated. If it is concluded that the preset time in the timer is up, on the other hand, the procedure proceeds to Step a7. Thus, the processes of Steps a3 to a6 are processes for continuously determining, for the preset time in the timer, whether or not the tension Ts detected by the tension detector 6 is within the preset range of tension. Before the preset time in the timer is up, the processor of the motor control section 20-1 for the feed motor M1 repeatedly executes the processes of Steps b3 to b7, thereby performing tension feedback control based on torque control.

When the preset time in the timer is up, the processor of the control section 30 outputs the machining start command and causes the power source unit (not shown) to apply a voltage between the workpiece 2 and the wire electrode 1, thereby starting electric discharge machining for the workpiece 2 based on a machining program. Further, the processor outputs tension control command based on speed control to the motor control section 20-1 for the feed motor M1 (Step a7), outputs a second tension command T2 to the motor control section 20-1 for the feed motor M1 (Step a8), and the completion of the machining is awaited (Step a9)

When the tension control command based on speed control is detected (Step b7), the processor of the motor control section 20-1 for the feed motor M1 reads the second tension command T2 (Step b8), further reads the detected tension Ts from the tension detector 6 (Step b9), and obtains the tension deviation ε by subtracting the read detected tension Ts from the tension command T2 (Step b10). A speed command Vc is obtained by multiplying the obtained tension deviation ε by the proportional gain K1 (proportional gain for tension control based on speed control) (Step b11). Speed feedback control processing is performed based on the obtained speed command Vc and the speed detected by and fed back from the speed detector P1, whereby the torque command is obtained (Step b12). Current feedback control processing is performed based on the torque command (current command) Ic obtained by speed control processing and a fed-back driving current value, and the command voltage for the feed motor M1 is output to the amplifier 15-1 to drive the motor M1 (Step b13). Then, it is determined whether or not the machining is finished (Step b14), and the tension control based on speed control in the processes of Steps b9 to b14 is executed until the machining is finished. Thus, during the electric discharge machining, the tension feedback control is executed by controlling the rotational speed of the feed motor M1.

When the machining is finished, the processor of the control section 30 outputs machining end commands to the motor control sections 20-1 and 20-2, individually, to stop outputting the tension command T2 to the motor control section 20-1 and delivering speed command to the motor control section 20-2 (Step a10), whereupon this processing terminates.

Figure 5:
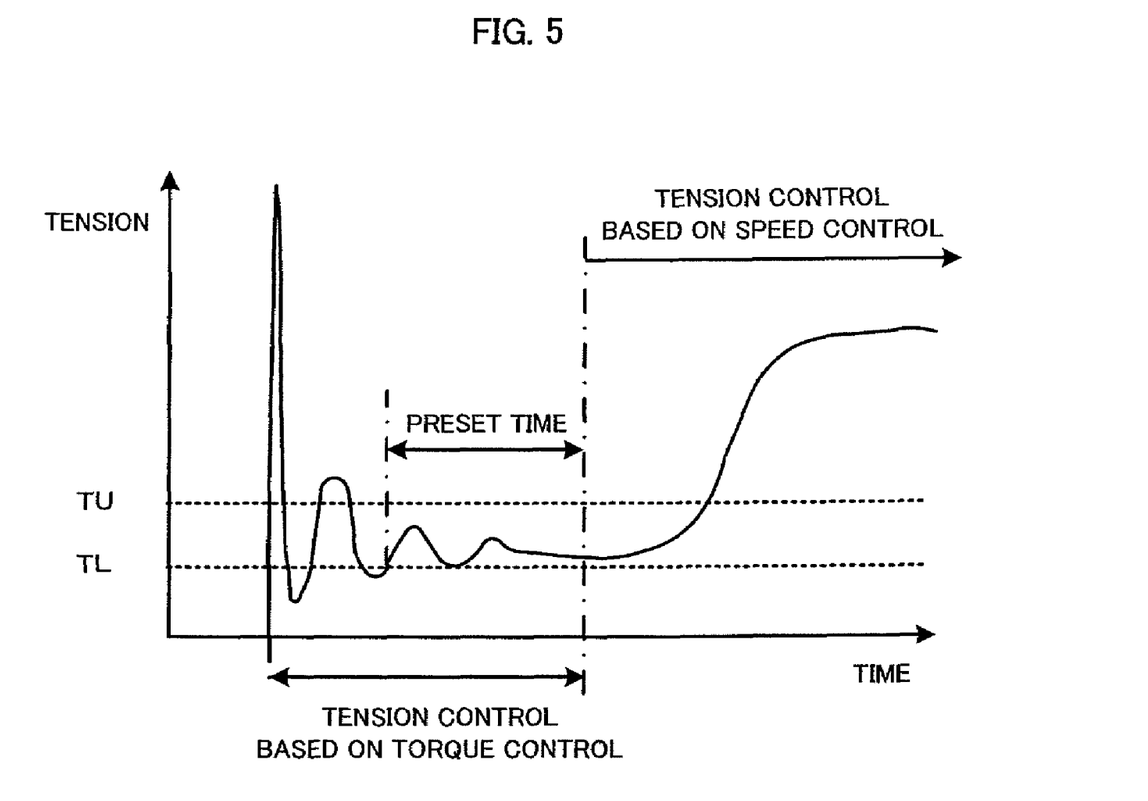
FIG. 5 is a graph showing a tension that acts on the wire electrode traveling in the wire-cut electric discharge machine shown in FIG. 1.

FIG. 5 is a graph showing a tension that acts on the wire electrode 1 traveling in the wire-cut electric discharge machine according to the present embodiment.

At the start of its travel, the wire electrode 1 is subjected to a heavy tension that is caused by the static friction force and inertial force of the guide rollers 12, feed roller 4, pinch rollers 5, etc. However, the output torque of the feed motor M1 that drives the feed roller 4 is controlled by the tension feedback control so that the detected tension on the electrode 1 agrees with a command tension. Therefore, the tension on the wire electrode 1 cannot be larger than in the case where the feed motor M1 is not torque-controlled. In consequence, the occurrence of breakage of the electrode 1 can be suppressed.

At the start, as described above, the travel of the wire electrode 1 is unstable under the influence of the static friction force and inertial force of the guide rollers 12 and the like, and the tension on the electrode 1 varies. However, the variation of the tension converges with the passage of time. In the present embodiment, the electric discharge machining is executed in a manner such that the control mode on which the tension feedback control for the feed motor M1 is based is switched from torque control to speed control when the variation of the tension is continued for a predetermined time such that the detected tension is within the predetermined range (from TL to TU).

If the wire electrode 1 is loose at the start of its travel, the tension on the electrode 1 can be controlled by controlling the torque of the feed motor M1 on the braking side. Therefore, the electrode 1 can be prevented from breaking without being subjected to an excessive tension. After the variation of the tension on the wire electrode 1 is stabilized within a predetermined range, on the other hand, the electrode tension can be controlled for electric discharge machining with speed control that ensures steadier tension control.

In the embodiment described above, tension control based on torque control is switched over to tension control based on speed control from tension control based on torque control when the detected tension falls into a predetermined range after the passage of a certain time since the start of travel of the wire electrode 1. Since the variation of the tension on the electrode 1 converges with the passage of time after the start of travel of the electrode 1, however, tension control based on torque control may alternatively be automatically switched over to tension control based on speed control from tension control based on torque control when the preset time has elapsed after the start of travel of the wire electrode 1.

In the processing shown in FIG. 3, in this case, it is necessary only that the timer be reset and started (Step a3) after the speed command is delivered to the delivery motor M2 without being followed by the processes of Steps a4 and a5, and that the procedure proceed to Step a7 when the preset time in the timer is up (Step a6).

In the foregoing embodiment, moreover, the wire electrode is run by rotating the delivery motor M2 at a predetermined speed, and the torque or speed of the feed motor M1 is controlled by tension feedback control such that the tension on the wire electrode detected by the tension detector 6 agrees with a command value. Alternatively (or in contrast with this), the torque or speed of the delivery motor M2 may be controlled by tension feedback control such that the tension on the wire electrode detected by the tension detector 6 agrees with a command value, with the feed motor M1 driven beforehand at a predetermined speed. Alternatively, moreover, the respective torques or speeds of both the feed and delivery motors M1 and M2 may be controlled based on the tension feedback control of the wire electrode 1.

Furthermore, the wire-cut electric discharge machine generally has an automatic wire connecting function, which involves cutting and automatic insertion of the wire electrode 1. A cutting system for the electrode 1 roughly includes the following two methods.

A: A method for mechanically cutting the wire electrode 1 by means of an edge tool.

B: A heat-cutting system in which a current is applied to the wire electrode 1 to heat a part of it and the electrode 1 is torn by rewinding.

In the case of the heat-cutting system for the wire electrode cutting (the above method B), a predetermined tension must be applied to the wire electrode as the electrode is cut. In doing this, torque control can be utilized as tension control is performed based on torque control so that the tension detected by the tension detector 6 is equal to a predetermined value, whereby a workpiece is heat-cut in a predetermined position.

What is claimed is:

1. A wire-cut electric discharge machine having a wire electrode tension control function and comprising a first motor for feeding a wire electrode to a workpiece to be machined, a second motor for delivering the wire electrode from the workpiece, and tension detecting means which is located between the workpiece and the first motor and detects a tension on the wire electrode, the wire-cut electric discharge machine further comprising:

speed detecting means for detecting respective rotational speeds of the first and second motors;

first control means for controlling the rotational speed of one of the first and second motors to be equal to a preset rotational speed;

second control means for controlling a rotational torque of the other of the first and second motors so that the tension on the wire electrode detected by the tension detecting means is at a preset value;

third control means for controlling the rotational speed of the other motor so that the tension on the wire electrode detected by the tension detecting means is at a preset value; and switching control means which causes the first control means to drivingly control the one motor, causes the second control means to perform torque control for the other motor, thereby running the wire electrode, and switches the second control means over to the third control means to perform speed control for the other motor when machining is started.

2. The wire-cut electric discharge machine having a wire electrode tension control function according to claim 1, wherein the switching control means starts the machining and switches the second control means over to the third control means after the passage of a preset time since the start of travel of the wire electrode.

3. The wire-cut electric discharge machine having a wire electrode tension control function according to claim 1, wherein the switching control means starts the machining and switches the second control means over to the third control means after the tension on the wire electrode detected by the tension detecting means is kept within a predetermined range for a preset time or longer after the wire electrode is run.

4. The wire-cut electric discharge machine having a wire electrode tension control function according to claim 1, which further comprises drive control means for driving the first motor with a preset torque.

5. The wire-cut electric discharge machine having a wire electrode tension control function according to claim 1, said one motor is the second motor and the other motor is the first motor.

* * * * *